(No Model.)

L. REDER.
DRILL CHUCK.

No. 406,112.                    Patented July 2, 1889.

WITNESSES:
John S. Cole
Wm R. Kemp

INVENTOR
Louis Reder
BY

ATTORNEY

UNITED STATES PATENT OFFICE.

LOUIS REDER, OF BALTIMORE, MARYLAND, ASSIGNOR TO CLARENCE M. KEMP, OF SAME PLACE.

DRILL-CHUCK.

SPECIFICATION forming part of Letters Patent No. 406,112, dated July 2, 1889.

Application filed April 23, 1889. Serial No. 308,332. (No model.)

*To all whom it may concern:*

Be it known that I, LOUIS REDER, a citizen of the United States, residing at Baltimore, and State of Maryland, have invented a new and useful Chuck for Holding Drills, &c., of which the following is a specification.

My improvement relates to a chuck for drills, &c., in which the jaws are operated by a screw placed immediately behind one of them, whereby the strain of the drill is carried in a direct and square way to the body of the screw and the threads on same, which ultimately carries the strain put on the jaws of the chuck. The operating-screw is double-threaded, having one thread made on top of the other. The threads vary in pitch, the outer one having twice as many threads to the inch as the inner threads whereby the revolution of the screw will always carry each jaw an equal distance toward the center or away from same. The arrangement of the jaws within a sleeve is a valuable and novel feature, and the manner of arrangement and construction of the teeth and jaws adds other desirable features to the chuck.

The accompanying drawings illustrate the principle of this invention.

Figure 1:
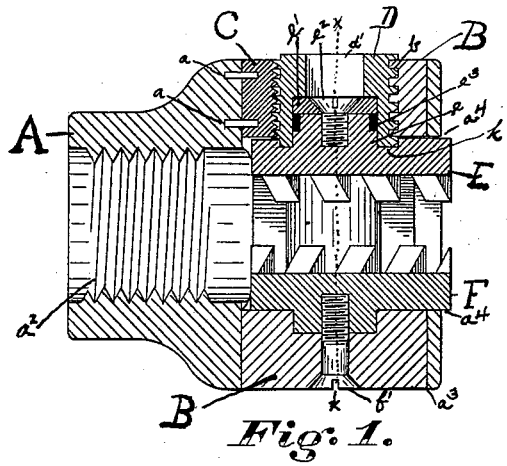
Figure 2:
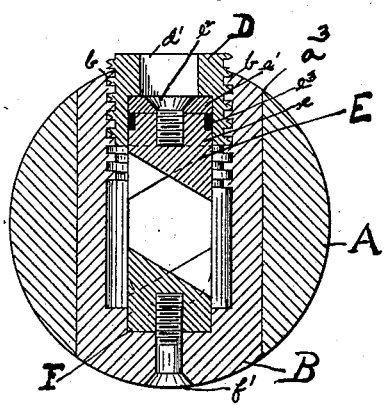
Figure 3:
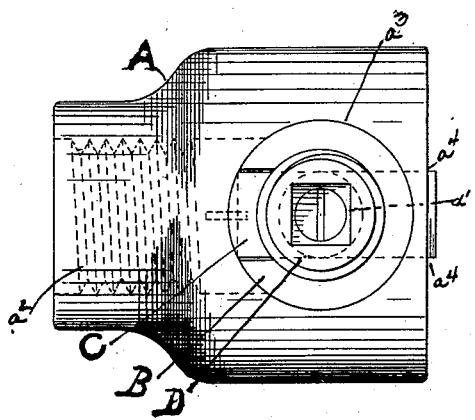
Figure 4:
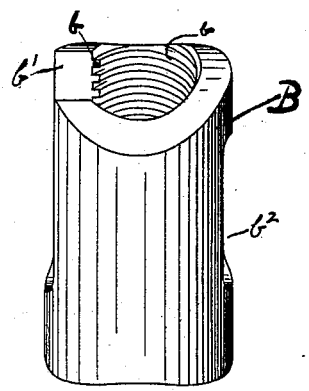
Figure 5:
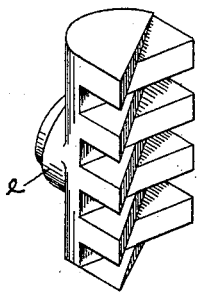
Figure 6:
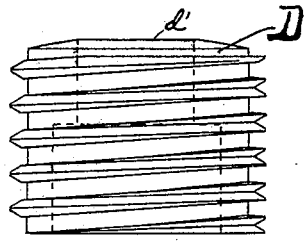

Figure 1 is a vertical section of the chuck from front to back. Fig. 2 is a cross-section on line $x$ $x$ of Fig. 1. Fig. 3 is a top view of the chuck. Fig. 4 is a view of the sleeve, taken at one side and above. Fig. 5 is a view of one of the jaws. Fig. 6 is an enlarged side view of the operating-screw, the dotted lines showing the recesses therein.

Similar letters refer to similar parts.

A is the body of the chuck, here shown to be threaded at $a^2$ to fit the spindle of a machine. It is bored through from top to bottom at $a^3$. (See Fig. 3.) It is also recessed in its front end at $a^4$. A sleeve B is placed in recess $a^3$, into which it neatly slides. This sleeve has an opening $b^2$ in its front portion about same size as recess $a^4$ in body of chuck, and has a corresponding opening opposite, which opening is elongated by being cut through to the top, as seen at $b'$, Fig. 4. This sleeve is threaded internally at its upper end with a square thread $b$. The lower end is preferably solid, and has a screw $f'$ passing through it to hold the lower jaw F in place.

A dog-piece C is made to fit neatly into the rear opening or slot $b'$ of sleeve B, and is secured to body of chuck by means of pins $a$ $a$. This dog-piece is threaded on its face with a V-thread of double the pitch of the square thread $b$ in the sleeve.

A screw D is threaded with a square thread to suit thread in sleeve. On this thread is cut a V-thread to suit thread of dog C. Screw D has a square recess $d'$ in its upper portion, into which a wrench with a square end engages for operating the same. The lower part of screw is recessed for a projection $e$ on upper jaw E to neatly enter. The projection $e$ of upper jaw is secured to screw D by means of screw $e^2$, washer $e'$, and ring $e^3$. The connection is made in this manner: The projection $e$ has its upper part cut down, so as to form, when in place in screw D an annular recess. A ring $e^3$ is made to suit this recess, but larger at its outside diameter. The washer $e'$ is dropped into the recess of screw D. Then ring $e^3$ is placed on projection $e$ and the latter forced into the recess of screw D. The screw $e^2$ is then entered from the top recess in screw D, thus making connection of upper jaw with screw D. The screw D, when forcing the jaw E downward, has its lower portion pressing and bearing against the top of jaw at K, and when the screw D is operated to raise the jaw E the ring $e^3$ engages the washer $e'$, which, by its connection with the jaw through screw $e^2$, effects the purpose. The two threads on screw D run the same way—that is, both are right-hand threads.

The projections or teeth of the jaws are cut in such manner as to be obliquely disposed across the jaw. In making same, the cut taken to make the face of each projection makes a corresponding oblique indentation or recess, each cutting producing a projection and recess in an oblique line across the jaw. Thus, when the jaws interlock, with a drill imposed between, the surfaces of the projections, coming in contact with the drill, are so spread as to prevent shearing the drill, which shearing occurs when there is much space at one point and a corresponding projection opposed thereto, with the drill between. By the oblique disposal of the projections, each projection having a corresponding recess at the continuation of its face beyond the center of the face of the jaw, a much better distributed frictional surface than has hitherto been known is obtained, and all liability to shear a drill is avoided.

The connection of screw D with jaw E is such as to allow the free revolution of screw D without altering its relation to jaw E.

Figs. 1 and 2 show the drill-chuck open to its fullest extent and the parts properly placed.

The operation of the chuck is as follows: By giving the screw D a whole revolution to the right it enters into sleeve B deeper, according to the pitch of the thread in B. We prefer eight threads to the inch and use same here. Thereby the upper jaw E, which is connected to screw D, is forced downward in the sleeve one-eighth of an inch, but at the same time the screw D, being also threaded with V-threads sixteen to the inch, has entered into the dog-piece C to the extent of one revolution, which means that the screw D has moved inwardly into the chuck one-sixteenth of an inch, as the dog-piece C is rigidly fastened to the chuck-body. Thus the upper jaw E, which takes its movement from the screw D, has advanced but one-sixteenth of an inch toward the center of the chuck. The lower jaw F is fastened to the sleeve and takes its movement from same, and as the latter has been pulled up on the the screw one-eighth of an inch and the screw at the same time has moved inwardly into the chuck one-sixteenth of an inch, the actual movement of the sleeve with reference to the center of the chuck is but one-sixteenth of an inch. Thus the two jaws have kept in accord in their movements. When screw D is revolved several times to the right, the jaws will meet and jam directly in the center of the chuck, and any drill or small work placed between the jaws will be held absolutely central.

The lower jaw is pulled up on the work in a square and direct manner, as it has a solid rest in the lower portion of the sleeve; hence its movement is in accord with that of the sleeve, which is at a right angle to axis of the chuck. The upper jaw is carried to the work also in a directly-square way. The lower end of screw D presses directly on it, compressing it solidly on the drill. The two jaws thus receive their actuation from points directly at their backs and in line with the point where the strain is applied to the drill. The result will be the same if the threads on screw D are both left-handed. The finer thread can be square; but I prefer the V-thread as having greater durability and strength.

What I claim is—

1. A screw-body having two threads, both inclined to the right or both inclined to the left, one of the threads being of double pitch to the other thread, in combination with two threaded bodies, one of which has thread of double pitch to the other, with both of which the screw-body has threaded engagement at the same time.

2. A chuck having its operating-screw threaded with two right-hand threads or two left-hand threads, one of the threads having double the pitch of the other.

3. A chuck having two jaws and but one operating-screw, which has its threads inclined only in one direction, the operating-screw being placed directly over the line of strain, whereby its power is applied in the straightest and most direct manner to the work.

4. The combination of a chuck-body with a sleeve in which the jaws are placed, the sleeve having a movement in the chuck-body at right angles to its axis.

5. The combination of chuck-body A with dog C, sleeve B, and screw D.

6. The combination of chuck-body A with dog C, sleeve B, screw D, and jaws E and F.

7. The combination of screw D with jaw E, having surface K, shoulder $e$, and ring $e^3$, washer $e'$, and screw $e^2$.

8. Interlocking jaws of a chuck having their projections and recesses obliquely disposed across the face of the jaws, as described, producing the fullest distribution of the frictional surfaces, as and for the purposes described.

LOUIS REDER.

Witnesses:
JOHN S. COLE,
WM. R. KEMP.